(12) United States Patent
Chesla et al.

(10) Patent No.: US 9,967,279 B2
(45) Date of Patent: May 8, 2018

(54) SYSTEM AND METHOD THEREOF FOR CREATING PROGRAMMABLE SECURITY DECISION ENGINES IN A CYBER-SECURITY SYSTEM

(71) Applicant: Empow Cyber Security Ltd., Ramat Gan (IL)

(72) Inventors: Avi Chesla, Tel Aviv (IL); Shlomi Medalion, Lod (IL)

(73) Assignee: Empow Cyber Security Ltd., Ramat Gan (IL)

( * ) Notice: Subject to any disclaimer, the term of this patent is extended or adjusted under 35 U.S.C. 154(b) by 0 days. days.

(21) Appl. No.: 14/716,359

(22) Filed: May 19, 2015

(65) Prior Publication Data

US 2016/0021135 A1 Jan. 21, 2016

Related U.S. Application Data

(60) Provisional application No. 62/085,844, filed on Dec. 1, 2014, provisional application No. 62/026,393, filed on Jul. 18, 2014.

(51) Int. Cl.
*G06F 7/04* (2006.01)
*H04L 29/06* (2006.01)
*G06F 17/30* (2006.01)

(52) U.S. Cl.
CPC .......... *H04L 63/1441* (2013.01); *H04L 63/02* (2013.01); *H04L 63/14* (2013.01); *H04L 63/145* (2013.01); *H04L 63/1483* (2013.01)

(58) Field of Classification Search
CPC ..... H04L 63/1441; H04L 63/02; H04L 63/14; H04L 63/145; H04L 63/1483;
(Continued)

(56) References Cited

U.S. PATENT DOCUMENTS 7,930,746 B1 * 4/2011 Sheleheda ........... H04L 63/1425
713/151
7,933,989 B1 4/2011 Barker et al.
(Continued)

FOREIGN PATENT DOCUMENTS

CN 102262716 A 11/2011

OTHER PUBLICATIONS

The International Search Report and the Written Opinion of the International Searching Authority for PCT/US2015/039664, ISA/RU, Moscow, Russia, dated Oct. 15, 2015.
(Continued)

*Primary Examiner* — Gary S Gracia
(74) *Attorney, Agent, or Firm* — M&B IP Analysts, LLC

(57) ABSTRACT

A system and method for adaptively securing a protected entity against cyber-threats. The method comprises: determining, based on at least one input feature, at least one normalization function, wherein the at least one input feature defines an attribute of a data flow to be evaluated by the SDE; receiving at least one engine rule describing an anomaly to be evaluated; and creating an inference system including at least one inference unit, wherein each inference unit is determined based on one of the received at least one engine rule, wherein the inference system computes a score of anomaly (SoA) respective of the at least one input feature.

22 Claims, 6 Drawing Sheets

(58) Field of Classification Search
CPC ............. H04L 63/1408; H04L 63/1416; H04L 63/1425; G06F 21/604; G06F 3/0484
See application file for complete search history.

(56) References Cited

U.S. PATENT DOCUMENTS

| | | | |
|---|---|---|---|
| 8,150,783 B2 | 4/2012 | Gonsalves et al. | |
| 8,572,750 B2 | 10/2013 | Patel et al. | |
| 8,800,045 B2 | 8/2014 | Curtis et al. | |
| 9,565,204 B2 | 2/2017 | Chesla | |
| 9,628,507 B2 | 4/2017 | Haq et al. | |
| 2003/0233567 A1* | 12/2003 | Lynn | H04L 41/0893 726/23 |
| 2004/0114519 A1 | 6/2004 | MacIsaac | |
| 2004/0143756 A1 | 7/2004 | Munson et al. | |
| 2008/0086435 A1* | 4/2008 | Chesla | H04L 63/168 706/12 |
| 2008/0167567 A1* | 7/2008 | Bashour | A61B 5/02405 600/518 |
| 2008/0288430 A1* | 11/2008 | Friedlander | G06F 17/30536 706/46 |
| 2009/0043724 A1* | 2/2009 | Chesla | H04L 65/1079 706/52 |
| 2011/0271341 A1* | 11/2011 | Satish | G06F 21/552 726/23 |
| 2012/0096549 A1 | 4/2012 | Amini et al. | |
| 2012/0096551 A1* | 4/2012 | Lee | G06F 21/55 726/23 |
| 2012/0096552 A1* | 4/2012 | Paek | G06F 21/552 726/23 |
| 2012/0263382 A1* | 10/2012 | Robinson | G01J 3/0264 382/191 |
| 2012/0304007 A1* | 11/2012 | Hanks | H04L 67/12 714/26 |
| 2012/0311132 A1* | 12/2012 | Tychon | H04L 41/5038 709/224 |
| 2013/0091085 A1* | 4/2013 | Sohn | G08B 31/00 706/46 |
| 2013/0091150 A1* | 4/2013 | Jin | G06F 17/3053 707/749 |
| 2013/0097662 A1 | 4/2013 | Pearcy et al. | |
| 2013/0097706 A1* | 4/2013 | Titonis | G06F 21/56 726/24 |
| 2013/0198840 A1 | 8/2013 | Drissi et al. | |
| 2013/0276122 A1 | 10/2013 | Sowder | |
| 2014/0053267 A1* | 2/2014 | Klein | G06F 21/552 726/23 |
| 2014/0068326 A1* | 3/2014 | Quinn | G06F 11/0709 714/15 |
| 2014/0215618 A1 | 7/2014 | Amit | |
| 2014/0283026 A1 | 9/2014 | Amit et al. | |
| 2014/0283050 A1 | 9/2014 | Amit | |
| 2014/0331279 A1 | 11/2014 | Aissi et al. | |
| 2014/0337974 A1 | 11/2014 | Joshi et al. | |
| 2015/0058993 A1* | 2/2015 | Choi | G06N 7/005 726/25 |
| 2015/0128274 A1 | 5/2015 | Giokas | |
| 2015/0242856 A1* | 8/2015 | Dhurandhar | G06Q 50/01 705/44 |
| 2016/0241581 A1 | 8/2016 | Waters et al. | |

OTHER PUBLICATIONS

The International Search Report and The Written Opinion of the International Searching Authority for PCT/US2015/060109, ISA/RU, Moscow, Russia, dated Mar. 10, 2016.

First Office Action for Chinese Patent Application No. 201580038953.X dated Jan. 11, 2018, SIPO, China.

* cited by examiner

SYSTEM AND METHOD THEREOF FOR CREATING PROGRAMMABLE SECURITY DECISION ENGINES IN A CYBER-SECURITY SYSTEM

CROSS-REFERENCE TO RELATED APPLICATIONS

This application claims the benefit of U.S. Provisional Application No. 62/085,844 filed on Dec. 1, 2014 and U.S. Provisional Application No. 62/026,393 filed on Jul. 18, 2014, the contents of which are hereby incorporated by reference.

TECHNICAL FIELD

The present disclosure generally relates to cyber security systems, and more particularly to real-time customizable and programmable cyber security systems for threat mitigation.

BACKGROUND

The Internet provides access to various pieces of information, applications, services, and vehicles for publishing information. Today, the Internet has significantly changed the way we access and use information. The Internet allows users to quickly and easily access services such as banking, e-commerce, e-trading, and other services people access in their daily lives.

In order to access such services, a user often shares his personal information such as name, contact details, and highly confidential information such as usernames, passwords, bank account number, credit card details, and the like, with service providers. Similarly, confidential information of companies such as trade secrets, financial details, employee details, company strategies, and the like are also stored on servers that are connected to the Internet. There is a threat that such confidential data may be accessed and leaked out by malware, viruses, spyware, key loggers, and various other methods of unauthorized access, including using legitimate tools (e.g., a remote desktop and remote processes services) that have been compromised to access or to install malware software that will allow access to such information as well as insiders (organization's users) with a bad intent to steal information from the organization. Such unauthorized access poses great danger to unwary computer users.

Recently, the frequency and complexity level of attacks has increased with respect to attacks performed against all organizations including, but not limited to, cloud providers, enterprise organizations, and network carriers. Some complex attacks, known as multi-vector attack campaigns, utilize different types of attack techniques and target network and application resources in order to identify at least one weakness that can be exploited to achieve the attack's goals, thereby compromising the entire security framework of the network.

Another type of complex attack is an advanced persistent threat (APT). An APT is an attack in which an unauthorized hacker gains access to a network and remains undetected for a long period of time. The intention of an APT attack is usually to steal data rather than to cause direct damage to the network or organization. APT attacks typically target organizations in sectors with high-value information, such as the national defense, manufacturing, retail, and financial industries.

These attacks are frequently successful because modern security solutions are not sufficiently agile and adaptive with respect to detection, investigation, and mitigation of resources needed to meet such evolving threats. Current security solutions cannot easily and promptly adapt to detect and mitigate new attack behavior, or attacks that change their behavior in a significant manner in order to evade them. In addition, current security solutions cannot easily and promptly adapt to new network technologies and topologies implemented by the entities to be protected.

For an example that illustrates some of the complexity involved with today attacks, in modern computing platforms, such virtualization and software-defined networks (SDN) face real challenges to security systems. Such platforms host an enormous number of tenants with virtual distributed and dynamic resources. Each protected entity can be removed or created in minutes and can be transformed into a malicious resource, thereby attacking its own "neighbors," local or remote network entities.

In addition, cyber attackers currently use generic platforms, such as mobile application frameworks, web application frameworks, cloud service platforms, and specific platforms for creating malware and Bot applications for their own malicious purposes in a fast manner. These various platforms, together with the "element of surprise" that is usually on the side of the attacker, create an often unbeatable challenge for defenders. Attacks can arrive from anywhere, at any volume, and in any dynamic form.

Specifically, currently available solutions suffer from drawbacks including lack of, for example, programmability capabilities, automatic mitigation, and collaboration. For example, a security defense system that is not programmable becomes ineffective in a matter of a few days or even a few hours because such security systems fail to resist or adapt in time to any new attack behavior which aims to bypass/evade the security systems.

Moreover, current security solutions do not share attack information and detection, investigation, and mitigation solutions between different companies due to the risk of revealing confidential data of a protected entity. Solutions typically operate in "silos" where they do not share any detection, investigation, or effective mitigation means between different solutions. This lack of communication limits the ability to adapt one security system using information related to attack behavior detected by another system in another organization or same organization, which would permit the security systems to promptly react to new threats by allowing a security system that has been subject to a new threat, and successfully addressed the threat, to provide information about the security functions or applications that were used.

The ability to promptly react to new threats is particularly important in modern security applications because today's attacks evade most advanced cyber-attack detection and prevention technologies in a matter of days and sometimes even hours. Attackers behind well-organized advanced attack campaigns can analyze the security products' capabilities before and during the attack and then modify their attack tools, create new malware software, change the "route" of attack, and otherwise manipulate the attacks in ways that bypass defenses and, eventually, can be used to achieve the attacker's goal.

For a modern security expert to develop a solution, the expert should be skilled in a number of complex security techniques including, for example, control of computing resources, advanced analytics systems, and different types of security products with no standard control "language."

Additionally, such a security expert cannot realize a combination from security functions provided by different security systems and/or vendors. Typically, such functions are not programmable, and thus cannot be integrated with other functions. In addition, to define and create a new security function currently requires months of research and development. For evolving attacks and threats, these are not feasible solutions.

Therefore, the way current security solutions operate prevents the implementation of optimal security solutions that address all the security needs in organizations.

Currently, even though an ample number of security solutions, services, and functions exist, there is no platform that allows collaboration between different security solutions, services, and/or functions, collaboration in the sense of sharing security solutions rather than sharing security vulnerabilities, exploits, and attack vectors. Furthermore, there is no platform that allows reprogramming of the services and functions on the fly to handle a new or a modified version of a threat. For example, when security functions are bypassed, they cannot be reprogrammed to detect and prevent the new attack behavior (e.g., the same attack that has caused a security breach).

It would therefore be advantageous to provide a solution that would overcome the deficiencies of the prior art cyber security systems by permitting readily adaptable and customizable cyber security system and security functions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for adaptively securing a protected entity against cyber-threats. The method comprises determining, based on at least one input feature, at least one normalization function, wherein the at least one input feature defines an attribute of a data flow to be evaluated by the SDE; receiving at least one engine rule describing an anomaly to be evaluated; and creating an inference system including at least one inference unit, wherein each inference unit is determined based on one of the received at least one engine rule, wherein the inference system computes a score of anomaly (SoA) respective of the at least one input feature.

The disclosed embodiments also include a system for adaptively securing a protected entity against cyber-threats. The system comprises a processing unit; and a memory, the memory containing instructions that, when executed by the processing unit, configure the system to: determine, based on at least one input feature, at least one normalization function, wherein the at least one input feature defines an attribute of a data flow to be evaluated by the SDE; receive at least one engine rule describing an anomaly to be evaluated; and create an inference system including at least one inference unit, wherein each inference unit is determined based on one of the received at least one engine rule, wherein the inference system computes a score of anomaly (SoA) respective of the at least one input feature.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
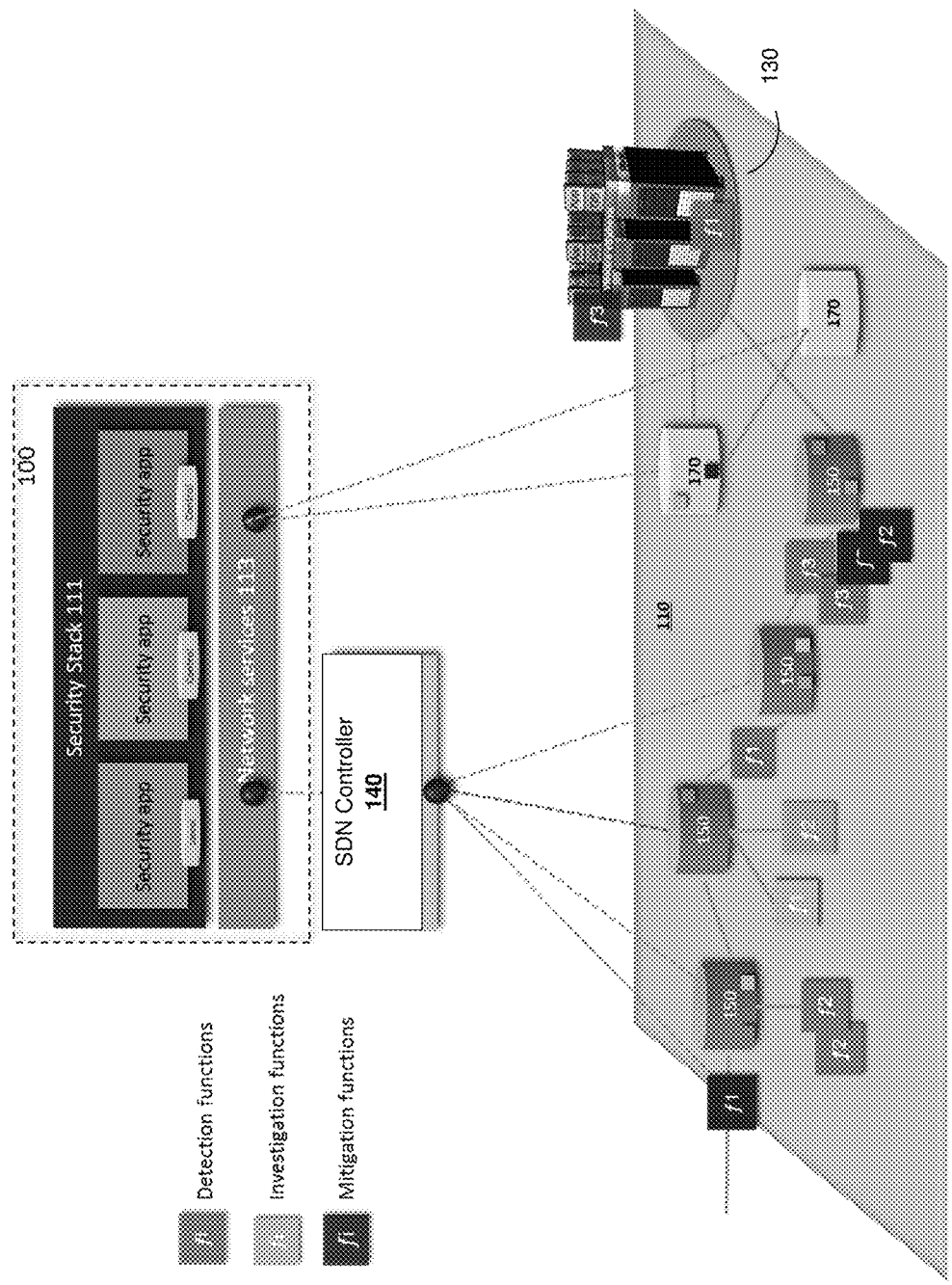
FIG. 1 is a diagram of a cyber-security system implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include cyber security systems and methods thereof. The disclosed embodiments are designed to secure protected entities. A protected entity may include, for example, a L2/3 network element, a server application (e.g., Web, Mail, FTP, Voice and Video conferencing, database, ERP, and so on), "middle box" devices (e.g., firewalls, load balancers, NAT, proxies devices, etc.), SDN controllers (e.g., OpenFlow controllers and virtual overlay network controllers), and personal computing devices (e.g., PCs, laptops, tablet computers, smartphones, wearable computing devices, a smart TV, and other Internet of Things devices with internet connectivity [also known as IoT]).

In some configurations, the protected entity may be deployed or otherwise accessed through various computing platforms. As noted above, computing platforms may include, but are not limited to, virtualized networks and software defined networks (SDN). The disclosed cyber security system is configured to detect and mitigate advanced persistent attack campaigns (APT attacks), web injection attacks, phishing related threats, misuse of applications and server resources, denial-of-service (DoS) and distributed DoS (DDoS) attacks, business logic attacks, violations of access policy, and so on. The APTs include, but are not limited to, malware command, control, and spreading. The business logic type of attacks include, but are not limited to, network intelligence gathering such as network scans, application scans, and web scraping types of attacks.

The disclosed cyber security system is designed to achieve comprehensive protection by providing a programmable, customizable, and adaptive architecture for responding to cyber threats.

In an embodiment, the disclosed embodiments are implemented in a cyber-security system that is arranged as a layered model, thereby allowing the system to adapt to changes in the protected entity and to ongoing attack campaigns. The disclosed embodiments provide the ability to create, define, or program new security applications, application's tenants, and security decision engines (SDEs), in order to modify the functionality of existing applications and SDEs and to easily correlate and create workflows between multiple applications, application's tenants, and SDEs. A security application defines how to detect and mitigate threats to a protected entity as well as which specific resources should be utilized for the protection. A security application's tenant typically defines where the protection should take place (i.e., which network entities should be protected). In an embodiment, a security application can be defined using a set of security services discussed in more detail below.

A SDE is a building block of a security application and is a programmable function that can measure, identify or otherwise quantize malicious activity. SDEs are based on a set of engine rules. The rules can be pre-defined, or can be modified by a user (e.g., a security administrator) at any time including, e.g., prior to, during and after an attack.

The security applications and/or SDEs can be shared or collaborated across different cyber security systems of the same or different companies. In an embodiment, security applications and/or SDEs can be saved in a central repository, thereby allowing system administrators to import applications/SDEs to their systems or to export applications/SDEs that have been developed. It should be noted that a plurality of security applications/SDEs can be utilized to detect, investigate, and mitigate an on-going attack campaign.

FIG. 1 is an exemplary and non-limiting diagram of a cyber-security system 100 implemented according to one embodiment. The cyber-security system 100 is configured to protect an entity (hereinafter a "protected entity") 130 communicatively connected in a network 110. The cyber security system 100 is also connected to the network 110. The network 110 may be, but is not limited to, a virtualized network, a software defined network (SDN), a hybrid network, a cloud services networks, or any combination thereof.

A SDN can be implemented in wide area networks (WANs), local area networks (LANs), the Internet, metropolitan area networks (MANs), ISP backbones, datacenters, and the like. Each network element in the SDN may be a router, a switch, a bridge, a load balancer, a DPI device, and so on, as well as any virtual instantiations thereof. Typically, elements of the SDN include a central SDN controller 140 and a plurality of network elements 150. In certain implementations, the central SDN controller 140 communicates with the network elements 150 using an OpenFlow protocol which provides a network abstraction layer for such communication; a Netconf protocol which provides mechanisms to install, manipulate, and delete the configuration of network devices; and so on. In an exemplary configuration, the network 110 may be a hybrid network in which a SDN is a sub-network of a conventional network whose elements cannot be programmed by a central SDN controller.

In one embodiment, the security system 100 interfaces with the network 110 through the central SDN controller 140. In another embodiment, the functionality of the cyber-security system 100 can be integrated in the central SDN controller 140. Alternatively, the cyber-security system 100 may communicate directly with the network elements 150 in the data-plane (or it can be a mix of the above). This allows implementing security functions in various locations in the network 100 (SDN, Legacy (non-SDN) networks, or hybrid networks) to protect the protected entity 130.

In an embodiment, security functions are programmed by the cyber-security system 100 to perform detection, investigation, and mitigation functions (labeled as f1, f2, and f3, respectively, in FIG. 1). The functions are executed during different phases of the operation of the cyber-security system 100, i.e., detection, investigation, and mitigation phases and independently programmed by the cyber-security system 100. It should be noted that some or all the functions (f1, f2, and f3) can be implemented or otherwise performed in the network 110.

The cyber-security system 100 includes a security stack module 111 and a network interface module 113. The security stack module 111 is configured to control and execute the various phases to protect the protected entity 130. Specifically, the security stack module 111 is configured to create, control, program, and execute the security functions (f1, f2, and f3) through a plurality of security applications or "apps." The operation of the security stack module 111 is discussed in greater detail herein below with respect to FIG. 2.

The network interface module 113 provides an interface layer of the cyber-security system 100 with the central SDN controller 140 to allow communication with the SDN-based network elements 150. In another embodiment, the network interface module 113 also communicates with "legacy" network elements 170 in the network 110. Non limiting examples for communication drivers that allow for configuration, control, and monitoring of legacy network elements include, but are not limited to, border gateway protocol (BGP) flow specifications, NetConf, command line interfaces (CLIs), NetFlow, middle-box devices drivers (e.g., L4-L7 drivers, DPI device drivers), end point device drivers (mobile, host based security applications), server applications, and so on.

Figure 2:
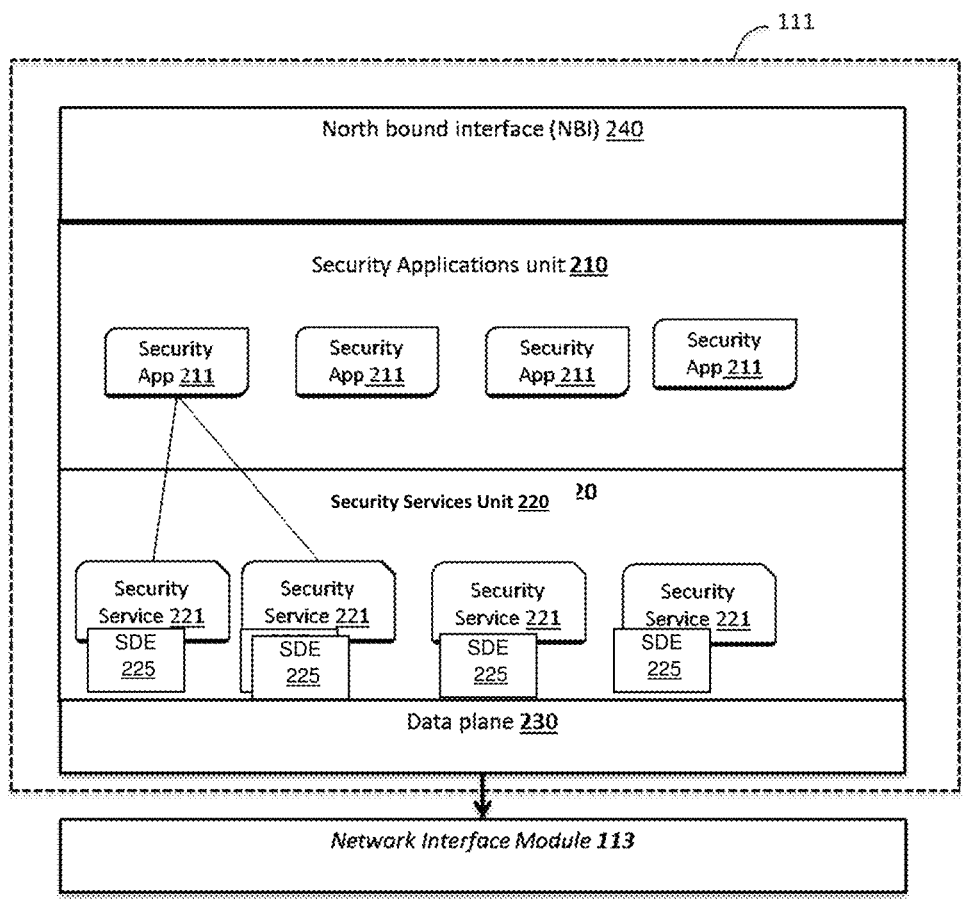
FIG. 2 is a block diagram of a security stack module implemented according to an embodiment.

FIG. 2 shows an exemplary and non-limiting block diagram of the security stack module 111 implemented according to one embodiment. In an exemplary implementation, the security stack module 111 includes the following units: a security applications unit 210, a security services unit 220, a data-plane unit 230, and a northbound interface (NBI) 240. The security stack module 111 includes security services 221 that are reusable across different security applications 211. Thus, different security applications 211 (each one for different purpose) can consume the same security services 221 for their own needs.

Specifically, the security application unit 210 includes security applications (apps) 211. Each security application 211 represents a different type of security protection or function including, for example, APT detection and mitigation, low and slow attacks protection, reputation security intelligence, web page scraping detection, mitigation, and so on. The modules or functions interfacing with a security application provide the required services, thereby allowing the creation or otherwise updating of a security application according to evolving security needs.

In an embodiment, the security applications unit 210 is preconfigured with a set of security applications 211. Additional security applications 211 can be added and removed from the security applications unit 210 as needed. In an embodiment, all security applications 211 hosted in the security application unit 210 implement pre-defined APIs in order to efficiently communicate with the security services 221.

The security services unit 220 includes different types of security services 221. Each security service is designed to serve one or more security applications 211. The security services 221 are also designed to provide efficient control and data collection over security functions ($f_1$, $f_2$, and $f_3$) in the network data-plane.

Each security service 221 includes one or more programmable security decision engines (SDEs) 225. The system 100 can use a set of pre-defined SDEs 225, import SDEs 225, and/or create a new SDE, and share (export) the newly created SDE. The creation and modification of such SDEs can be performed through an abstract proprietary programming language. The SDEs 225, and therefore the security services 221, can allow the cyber-security system 100 to adapt to new threats, new and unknown attack behaviors of a known type of threat, and attacks that utilize new evasion techniques. The SDEs 225 are described further herein below with respect to FIGS. 4-6.

Following are exemplary and non-limited security services 221 that can be maintained and executed by the security services unit 220. A first type of security service provides programmable anomaly detection of network activities toward the network elements (e.g., toward routers, switches misuse of bandwidth resources, and so on).

Another type of security service provides programmable anomaly detection of network activities toward the server applications (e.g., Web, mail, FTP, VoIP, on so on). Another type of security service provides programmable detection of users' anomalous activities.

Another type of security service allows for managing and analyzing multiple types of reputation sources (third party intelligence security sources). The service also allows creation of a self-generated reputation database that can become a reputation source for other security applications in the system and for third party security systems. The reputation database maintains reputation information of network entities such as clients and services (sites). Such reputation information may be used to evaluate if these entities can possess a threat. A threat may be, for example, a source of SPAM activities, a command and control server, drop zone servers, website that are known to be phishing sites, sites that includes malware software, and the like.

Another type of security service allows programming advanced challenge-response actions that validate the legitimacy of users' applications. Yet another type of security service allows control for multiple types of sandbox functions in the network (mixing-and-matching the best functions for each task) in order to analyze content such as web objects, mails attachments, executable files, and so on, and to identify anomalous code behavior. This type of service also allows creation and modification of sandbox analysis rules for analysis optimization.

Yet another type of security service generates real-time (RT) attack risk-chain patterns. These real-time attack risk-chain patterns represent network traffic patterns of attacks, such as user-based attacks (e.g., malware generated network traffic activities), server-based attacks (e.g., web scraping network activities, brute-force network activities, etc.) and network-based attacks (e.g., network Distributed Denial of Service (DDoS) attack network activities). These real-time attack risk-chain patterns can be used for real-time mitigation of threats, as well as for reputation and forensic analysis.

Yet another type of security service allows for management of multiple types of attack signatures databases (DBs) (for example, third party intrusion attack signature databases), integration and/or injection of the relevant attack signature into data-plane DPI functions, and monitoring of the results in a way that can be managed by the security application or by other security services.

Yet another type of security service allows mapping a source IP address to a network user identity and host name. This service may be communicatively connected to the north bound interface 240 in order to query the information from third party identity management systems (e.g., domain controllers, DHCP servers, DNS servers).

It should be noted that programmability of the security stack module 111, as enabled by the architecture of the system 100, allows a user to select different types of security services 221, thereby providing a mix and match capability. Specifically, this capability is achieved by the data plane unit 230 and a network interface module 113 which provides an abstraction layer for all underlining data-plane functions in the network (such as routers, switches, DPI devices, sandbox servers, challenge-response servers, and so on).

Information that is needed for operation of the security services 221 may be retrieved from the data-plane unit 230 and/or from the north bound interface 240. It should be noted that the security services 221 in the security services unit 220 also communicate and interface with the security applications unit 210 (the security applications unit 210 controls and manages the security services 221 in the security services unit 220).

It should be further noted that the security services listed above are merely examples, and that other security services can be utilized in the cyber-security system 100 without departing from the scope of the embodiments disclosed herein. In various non-limiting embodiments, a programming language is provided in order to allow users to create and modify security applications and to create and modify the SDEs included in each security service, as per business needs.

The data-plane unit 230 provides central management of the data-plane resources such as routers, switches, middle-box devices, and so on. In an embodiment, the data plane unit 230 allows the security services to retrieve and store the required network and application information from the data plane resources as well as to enforce security network control actions. Various functions provided by the data plane unit 230 include topology discovery, data collection, and traffic copy and redirection services which include traffic distribution (L2, L3 load balancing for scaling out network resources), traffic copy, and so on.

Topology discovery involves interacting with the data-plane network elements, SDN controllers, and orchestration systems in order to retrieve network topology information. This function is important for the topology awareness that is needed by other data-planes' functions as well as security services and applications.

The traffic copy and redirection services are designed to manage all network traffic redirection functions which include, but are not limited to, traffic redirection, smart traffic copying (copy based on L2-L4 traffic filter parameters), traffic distribution, and so on.

The data collection may involve collecting statistics data from the probes and storing such statistics. Statistics collection may include, but is not limited to, network-based statistics from network elements; application-based network statistics from DPI resources (including middle-boxes and servers); and user-based statistics from network, DPI, middle boxes, and end-point resources. The collector services normalize the statistical information into a format that can be analyzed by the security services 221 in the security services unit 220.

The data-plane unit 230 further provides the following functions: management of quality of service (QoS) actions in the network elements, and a set of mitigation functions. The mitigation functions include basic access control list (ACL) services, which are layer-2 to layer-4 access control list services that manage the distributed rules throughout the network elements. Software defined networks, as well as legacy network elements and hybrid networks, may be supported by this service.

Advanced ACL functions possess similar characteristics to basic ACL functions, but can define more granular access rules including application parameters (L7). Specifically, an ACL function can use the generated RT risk-chain pattern from a real-time risk-chain generation service (discussed above) as a blocking rule. It should be noted that risk chain pattern can be used by other services, such as investigation services (IDS/IPS, sandbox, and so on) to investigate specific flows and network entities that are included in the risk-chain pattern.

The ACL function typically operates with DPI network elements for enforcing the application level ACL rules. Service rate-limits manage the QoS rules in the data plane device. Black-hole route function provides an extension of the redirection data-plane services that manage redirection of users into a black-hole. Typically, black-holes are network locations where incoming or outgoing traffic is silently discarded (or "dropped") without informing the source that the data did not reach its intended recipient.

In an embodiment, the data-plane services allow both real-time detection and "near" real-time detection. Real-time detection of attacks is facilitated by feeding the statistics directly from the data-plane collectors, in real-time, to the security services unit 220 without storing the raw stats (i.e., storing only the result in the security services unit 220). In general, the data-plane unit 230 provides all raw information that is required by the security services 221 and controls the network via decisions made by the security services 221 and the security applications 211.

In some exemplary implementations, certain functions provided by the data-plane unit 230 can be implemented in the central SDN controller 140. Examples for such functions may include, but are not limited to, redirection, topology discovery, and data collection.

The north bound interface 240 interfaces between the security stack module 111 and one or more external systems (not shown). The external systems may include, for example, third party security analytics systems, security intelligence feeds, security portals, datacenter orchestration control systems, identity management systems, or any other system that can provide information to the security stack module 111. This enables a wider context-based security decision making processes. In an embodiment, the interfaces 240 may include standard interfaces, such as CLI, REST APIs, Web user interface, as well as drivers that are already programmed for control, configuration and/or monitoring of specific third party systems, and so on. The north bound interface 240 also interfaces with network interface module 113.

In an exemplary and non-limiting embodiment, the security services 221 may include, but are not limited to, a network anomaly security service, a user application anomaly security service, a sandbox security service, a reputation security service, a user identity security service, attack signatures security service, a challenge-response security service, a risk-chain pattern generation security service, an anti-virus (AV) security service and a Web application (WAF) security service.

The network anomaly security service is a near real-time service that is programmed to analyze user-based network behavior. In an embodiment, the network anomaly security service includes a user profile data structure and a set of SDEs programmed to continuously generate user-based scores of anomaly (SoA). A SoA is a security signal that can be correlated by a security application 211. A high SoA reflects a user network behavior anomaly that characterizes different types of network-based attacks, such as network pre-attack probes scanning activities (intelligence gathering), malware (L3/L4 network level) propagation activities, low and slow misuse of TCP stack resource attacks, abnormal user communication control channel behavior (e.g., abnormal usage of remote desktop applications, etc.), and so on. In an embodiment, any detection performed by the network anomaly security service is performed in near real-time. To this end, the network anomaly security service is programmable to generate a complex event-processing design model that does not store long-term user data and can work in-memory without write/read operation to the DB.

The user application anomaly security service is programmed to continuously learn the network and application connections activities of a user (or a group of users). In an embodiment, the service implements one long-term (e.g., lasting at least 12 weeks) adaptive baseline per traffic parameter. The user profile data structure of this service aggregates L3-L7 parameters as well as application metadata and continuously generates baselines for each parameter (or for multiple parameter functions such as traffic ratio), including 24 by 7 (24×7) differentiated baselines, i.e., storing base line per time and day in the week.

The user application anomaly service includes a set of SDEs 225 programmed by a set of engine rules. A user can modify and program new SDEs 225 by defining a new set of engine rules. Each SDE is programmed to continuously generate a SoA per user or per user group it analyzes. Each generated SoA may include, but is not limited to, a value and metadata representing the characteristics of anomalous traffic flows such as, e.g., IP addresses, client name, service name, IL4 protocol, L7 protocol, L4 port, and so on. High values of generated SoAs reflect unusual user application activity, such as communication with drop points (or drop zone), communication with command and control servers, malware propagation activities, application brute-force, application scans, user-misbehaving applications (e.g., fake applications), and so on. A drop point provides internal and external drop-points/zones that are used as part of advanced information stealth attack campaigns.

In an embodiment, both network and user application anomaly services can be programmed to generate SoAs that correlate signals from other security services 221. Such correlation is performed by a set of engine rules discussed in greater detail below.

Other types of security services 221 that can be used to detect APT threats include, but are not limited to, a user challenge-response security service that is configured to allow the programming of advanced challenge-response actions that validate the legitimacy of users' applications, and a user real-time risk-chain pattern generation security service, which is responsible for analyzing detected anomaly parameters (e.g., an anomaly that was detected by the user application anomaly service) and to create, in real-time or near real-time, a pattern that characterizes the attack campaigns. Such patterns can be used for real-time investigation (by the security investigation services such as AV, Sandbox, IDS/IPS, etc.) and for mitigation of threats, as well as for reputation and forensics analysis.

It should be noted that the security services 221 listed above are merely examples and other services can be utilized in the system 100 without departing from the scope of the embodiments disclosed herein. In various non-limiting embodiments, a programming language is provided in order to allow users to create and modify security applications and to create and modify the SDEs included in each security service 221 on a case-by-case basis.

Furthermore, each of the security applications unit 210, the security services unit 220, the data plane 230, and the north bound interface 240, as well as the security stack module 111, are communicatively interconnected through a predefined set of interfaces and/or APIs. As a result, the cyber-security system 100 is fully programmable and configurable. The interfaces may be designed to be unidirectional, one-to-one bidirectional, or one-to-many bi-directional for flows of information between the various modules and units.

It should be noted that modules in the cyber-security system 100, the security application unit 210, the security services unit 220, and the data plane 230 in the security stack module 111 are independent. Thus, any changes in one unit or module do not necessarily result in any changes to the other modules.

According to an embodiment, the cyber-security system 100 is designed to activate/deactivate and to correlate between security applications in unit 210 and security services in the unit 220 in order to define, create, or otherwise program a robust solution for detecting and mitigating attacks against the protected entity. The sequence for activating, deactivating, and correlating the various functions and modules of the cyber-security system 100, is based on one or more workflow rules. In an embodiment, the detection, investigation and/or mitigation functions are performed in the system 100 based on at least one workflow rule defined to handle a certain threat.

At a top level, the correlation model allows each security application to correlate feeds received from other security applications, thereby making the entire security decision-making process more holistic and context-based, i.e., correlating decision outputs from different security application types before making a final security decision.

To this end, each security application may communicate with other security applications and services by means of a controller managing the correlation of the different feeds.

At a lower level, the correlation of feeds occurs between multiple security services. This allows a single security application to make decisions based on multiple services in order to increase the overall decision accuracy.

According to one embodiment, the correlation of various feeds is performed by a set of workflow (or correlation) rules which are processed and applied by a controller of a security application. In an embodiment, the set of workflow rules is defined by the user. In another embodiment, the controller implements a learning mechanism to define or otherwise select a set of correlation rules to execute. The workflow rules are set respective of the attacks that the cyber-security system 100 can handle. That is, in an exemplary implementation, a set of workflow rules is defined for each different type of threat.

Each, some, or all of the modules of the cyber-security system 100 and the various units of the security stack module 110 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 3:
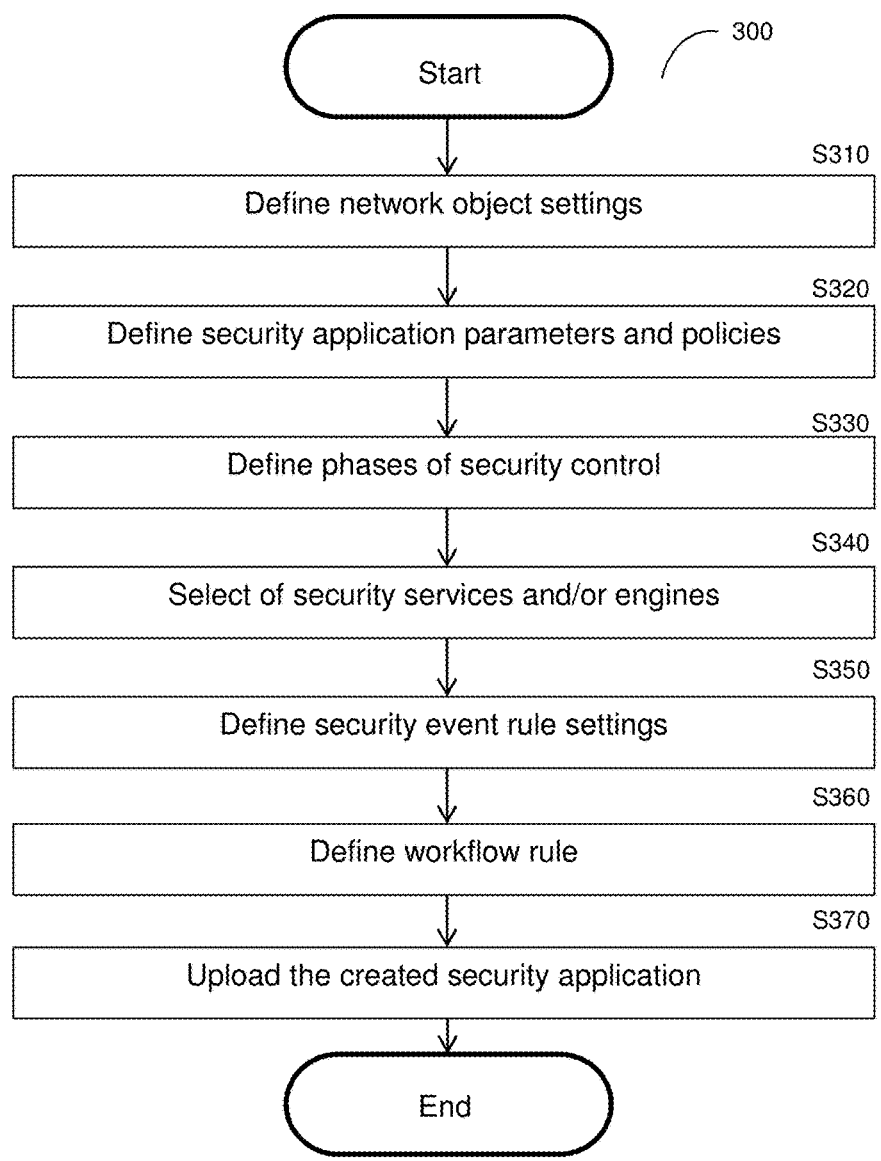
FIG. 3 is a flowchart illustrating creating a security application according to an embodiment.

FIG. 3 is an exemplary and non-limiting flowchart 300 illustrating creating a security application according to an embodiment. In S310, network object settings are defined. Network objects are sets of network definitions such as, but not limited to Internet protocol (IP) addresses, virtual LANs (VLANs), virtual extensible LANs (VXLANs), and so on. In an embodiment, network objects may be global and, therefore, useable by all security applications in a security platform. Network objects may be further grouped into network object groups. Network object settings may include, whether each network object is global, groupings of network objects, and so on.

In S320, general security application parameters and policies are defined. Such parameters and policies control the management access to the security application. Such parameters and policies may include, but are not limited to, a description of the security application (including, e.g., the purpose of the security application, relevant attack campaign names, and potential threat levels of such attack campaigns), an application white-list defining which users should be overlooked by the security application (the users may be selected based on, e.g., user name, IP address, host name, and so on), network object groups that are available to the protected entity utilizing the security application, and role based application control (RBAC) parameters defining the roles and/or permissions for tenants accessing the application (such as, e.g., read-only, read and write, read write, application design, and so on).

In S330, phases of security control are defined. Security control phases define the logical progression of detection and/or investigation and/or mitigation by the security application. The various security control phases can be performed in a pipe-line order, or in parallel.

As a non-limiting example, the security application may define a detection phase, an investigation phase, and a mitigation phase. In this non-limiting example, the security application continuously monitors for potential attacks during the detection phase. Once a potential attack has been identified, the security application undergoes the investigation phase until an investigation decision is made. Investigation decisions are based on, but are not limited to, validation of infected files on client/server machines (through AV investigation function), validation of whether a user is human or a machine (through challenge-response functions), and so on. Decisions may include types of additional functions to activate, mitigation actions to perform, and so on. Once an investigation decision is made, the security application enters the mitigation phase, during which an appropriate mitigation action is performed. The mitigation phase may last until an end of the attack campaign is identified.

In S340, security services and SDEs are selected respective of each defined security control phase. In various embodiments, a particular security service may be utilized in multiple control phases. The selected security services and SDEs apply to all protected entities (tenants) to be secured by the security application. Each selection security service is pre-configured with one or more SDEs. In an embodiment, the SDEs operable in security services can be modified, or additional SDEs can be added to each selected security service. In a non-limiting embodiment, the selection and reprogramming of SDEs is performed through a graphical user interface (GUI).

In S350, security event rule settings are defined. Triggered security events are further correlated to check if they satisfy at least one workflow rule. Events that satisfy at least one workflow rule will trigger an action such as, but not limited to, a mitigation action, an investigation action, and so on. Defining event rules is described further in U.S. patent application Ser. No. 14/615,020 filed on Feb. 5, 2015 (hereinafter the '020 application), assigned to the common assignee, which is hereby incorporated by reference for all that it contains.

In S360, one or more workflow rules are defined. A workflow rule defines a protected entity (tenant) protection behavior in each security control phase as well as the activation/deactivation of security services and each control phase. The workflow rules are discussed in more detail in the above referenced '020 application. It should be noted that the various settings, services, and/or rules utilized to create the security application can be customized per protected entity (tenant). In S370, The created security application can be uploaded to a security stack (e.g., the security stack 110) to start the protection and/or saved in a central repository (not shown) to enable utilization of the application by other services on the SST system.

Figure 4:
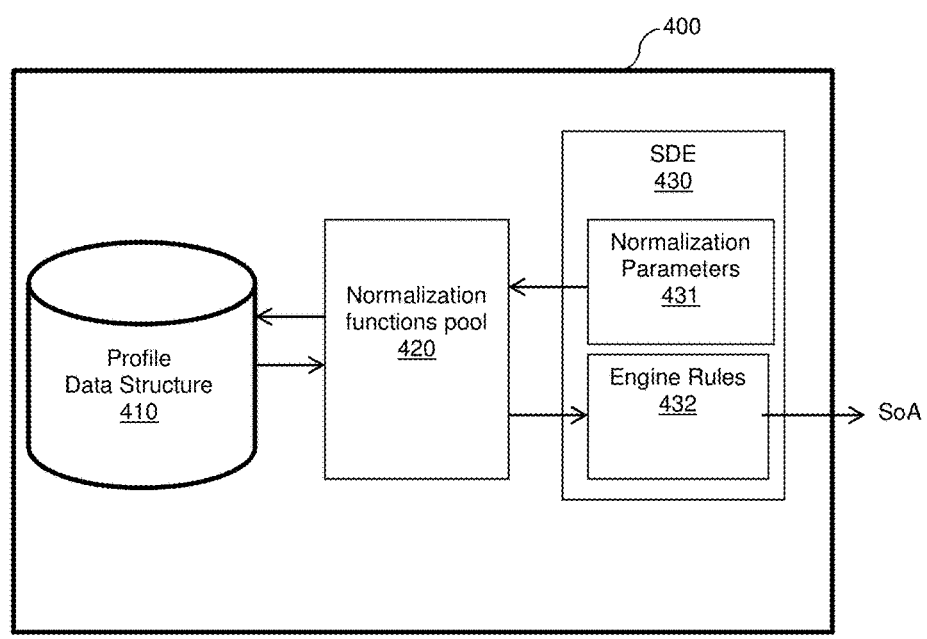
FIG. 4 is a schematic diagram illustrating a framework for executing and programming a security decision engine (SDE) according to an embodiment.

FIG. 4 is an exemplary and non-limiting schematic diagram illustrating a platform 400 configured to enable the operation of an SDE according to an embodiment. The platform 400 is further configured to allow programming of new or existing SDEs.

The platform 400 includes a profile data structure 410, a pool 420 of normalization functions, and at least one SDE 430. The profile data structure 410 contains statistics of traffic flows related to any entity in the protected system that can be monitored. Such an entity may include various users accessing or sending information out of the protected network, including servers, connections, and any devices that are part of the protected system. For example, if the protected network is the infrastructure of a retail chain, the profile data structure would contain statistics of traffic related to entities such as users accesses a web application (online shopping), various servers in the organization (e.g., finance, HR, orders, etc.), point of sales in the various stores, and so on.

In an embodiment, the traffic statistics in the profile data structure 410 are classified per feature. A feature is a measurable or computable attribute of a traffic flow that characterizes abnormal activity. Features are discussed in detail below. It should be noted that the platform 400 may include a plurality of profile data structures 410, and the operation of the SDE 430 may be based on inputs provided by one or more profile data structures.

The pool 420 includes several normalization functions that may be applied to statistics stored in the data structure 410 to yield behavioral levels. In an embodiment, the normalization functions may be statistically adaptive. In another embodiment, the normalization functions may be adaptive through machine learning techniques. In another embodiment, the normalization functions may be user defined. A normalization function may be, but is not limited to, Gaussian function, trapezoid function, triangle function, and so on.

The SDE 430 includes normalization parameter instructions 431 as well as engine rules 432. The normalization parameter instructions 431 define the normalization function types to be applied to the features stored in the user profile data structure 410 in order to evaluate the features' behavior in a clear and effective manner. Each normalization function receives at least one feature input and generates a behavioral level(s) of this feature.

The engine rules 432 provide guidelines for determining score of anomaly (SOA) levels based on the resulted behavioral levels (from the normalization functions). The SOA levels may be, but are not limited to, a security status of activity (e.g., normal, suspect, or attack), a degree of suspicion (e.g., low, medium, or high), a number in a certain range, and so on. Each engine rule 432 defines at least one input feature and a set of logical conditions that should be applied to these features' behavioral levels. Based on the logical conditions and the behavior levels of the features, SOA levels may be generated. For example, a particular predefined range of transmission rates of bytes per minute (BPM) may be considered a "High" level of suspicion. In that example, any transmission rate of BPM falling into that range will be determined to have a "High" SOA level value. The operation of the SDE 430 is determined by an at least one engine rule 432 and a normalization function.

The engine rule 432 can be created or modified by a user such as, e.g., a system/security administrator. Alternatively or collectively, the platform 400 may be configured with a set of predefined engine rules 432. In an embodiment, at least one engine rule 432 may be configured using an expert rules language, which permits a user to create or re-program the SDE 430.

In an exemplary and non-limiting embodiment, an engine rule is defined using the following syntax:

IF [group, flow, filter] feature [normalization parameters] IS [NOT] [behavioral level] [logical op] [flow, filter] feature . . . THEN SOA is [SoA level] [action$_1$], [action$_2$], . . . , [action$_R$]

where the parameter "Group" defines the group of network entities (e.g., clients, servers etc.) that will apply in calculating the defined features, and Where the parameter "flow" defines the flow level that will apply in calculating the defined features, e.g., BPM for all the user traffic in a certain group, BPM in the scope (flow level) of L4 connection, scope of (flow level) L7 connection, etc. (stored in the data structure 400) to be processed. The "filter" parameter specifies a more granular flow (e.g., specific L7 protocol such as HTTP, Gmail, Skype, etc.). The input feature determines a statistical feature of the flow data that should be evaluated by the rule. Input features including in a profile data structure may be evaluated by different statistical functions including, for example, Gaussian, aggregated time, sliding window, or a combination thereof. Each input feature can be evaluated using one or more predetermined statistical functions. Examples for features include a number of bytes per minute, a number of connections per minute, a number of destination layer-4 connections, flow duration, flow symmetry (ratio in/out), flow size, or any attribute related to the flow data maintained in the data structure 410.

Each input feature is associated with a finite set of normalization functions, where at least one normalization function is selected as a default normalization function.

The normalization function parameters are predefined parameters that set a respective (default) normalization function. These parameters can be used to set the characteristics of the selected normalization function, such as the detection sensitivity of the function (high, med or low sensitivity functions set), manual defined function (definition of the function shaper, etc.), and so on. The behavioral level is a behavior score that the normalization function generates. Each input feature can result in multiple behavior scores, e.g., a low score (a weight that represents the level of membership of the feature's value in the low behavior group), a medium score (membership weight in the medium behavior group), and high score (membership weight in the high behavior group).

The SoA level is a score of anomaly with a set of predefined levels, such as normal, suspect, attack or low, medium, and high, and so on. In an embodiment, the SDE 430 sets the SoA levels according to the logical rules and a pre-defined SoA output function. The actions are a set of predefined actions that take place in case the rule is matched. For example, when a rule is matched, an action can be defined to create sub user group, change detection sensitivity, stop learn, and so on. The engine rules provide logical operators such as: OR, AND, NOT, XOR, or other Boolean operator.

As an example, an engine rule may be as follows:

If (CPM is Med) AND (BPM is Med) then SOA is HIGH

In the above-example, the input features are a number of new connections per minute (CPM) and transmitted bytes per minute (BPM). The SDE outputs the SoA (score of anomaly) based on the values of the CPM and BPM as stored in the data structure, the behavioral levels generated by the normalization function(s) and the engine rules.

Figure 5:
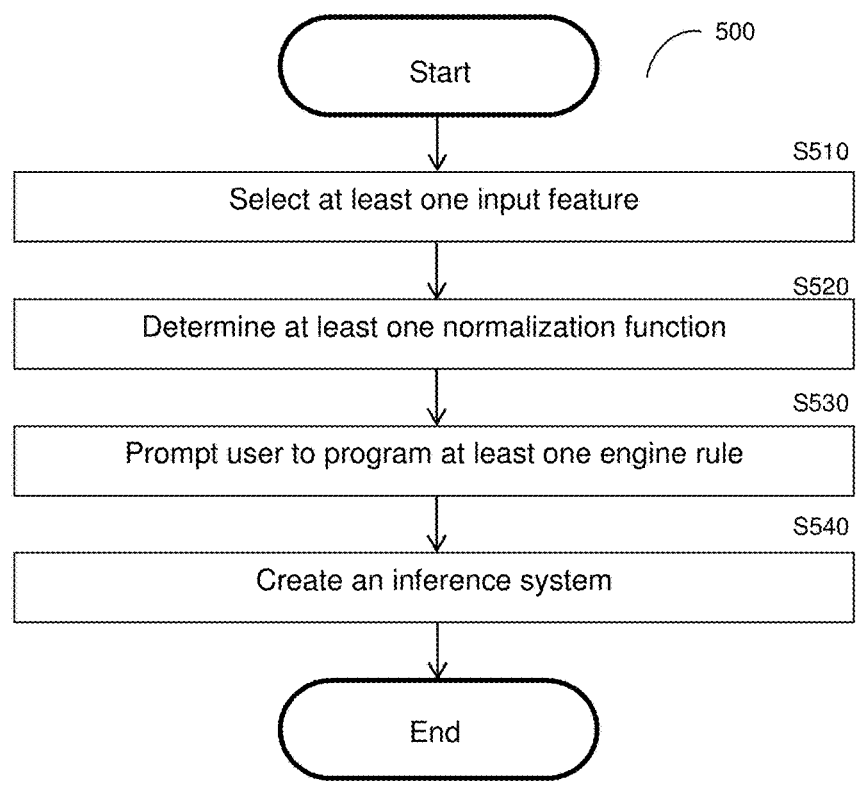
FIG. 5 is a flowchart illustrating generating a new SDE according to an embodiment.

FIG. 5 is an exemplary and non-limiting flowchart 500 illustrating generating a SDE according to an embodiment. In S510, at least one input feature is selected. The selected input feature indicates an attribute of the behavior to be evaluated.

In S520, based on the selected input feature, at least one normalization function is determined. In an embodiment, each input feature is associated with at least one normalization function. Thus, a selection of an input feature provides the associated normalization function. In an embodiment, a selection of an input feature also includes selection of at least one normalization function associated with the input feature.

A normalization function is a function applied to the input feature data to yield behavioral levels. In an exemplary embodiment, the behavioral levels are preset to low, medium (med), and high, and generated respective of the degree of membership.

Figure 6:
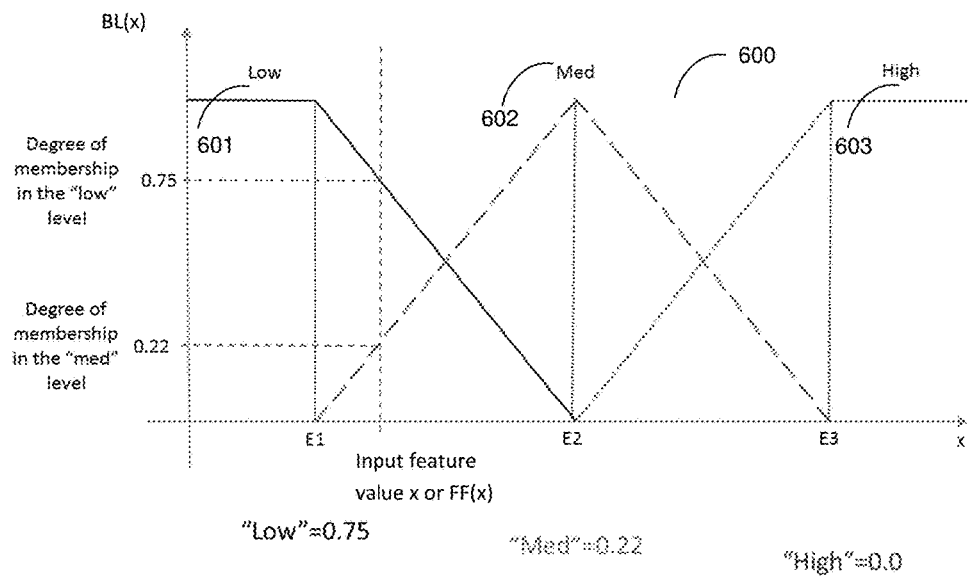
FIG. 6 is a graphical illustration of a normalization function utilized by the SDE according to an embodiment.

An exemplary and non-limiting normalization function 600 operates on a feature input (x) is shown in FIG. 6. FIG. 6 shows an exemplary and non-limiting normalization function 600 operating on a feature input (x). The edge values E1, E2, and E3, allow determination of the degree of membership of an input feature's value to a certain behavioral level. In an embodiment, values E1, E2, and E3 are adaptively set during predefined time intervals. In an embodiment, such time intervals are set respective of the input feature to be evaluated.

In a non-limiting example, the behavioral level is computed using 3 membership normalization functions (NFs), $NF^{LOW}$, $NF^{MED}$, and $NF^{HIGH}$ represent by graphs 601, 602, and 603 respectively. The membership functions can be expressed as follows:

If $(x<=E1)$ then $NF^{LOW}=1$ ($BL^{LOW}=1$);

If $(x>=E2)$ then $NF^{LOW}=0$ ($BL^{LOW}=0$);

If $(E1<x<E2)$ then $NF^{LOW}=(E2-x)/(E2-E1)$;

If $(x<=E1)$ then $NF^{MED}=0$;

If $(E1<x<E2)$ then $NF^{MED}=(x-E1)/(E2-E1)$;

If $(E2<x<E3)$ then $NF^{MED}=(E3-x)/(E3-E2)$;

If $(x>=E3)$ then $NF^{MED}=0$;

If $(x<=E2)$ then $NF^{HIGH}=0$;

If $(x>=E3)$ then $NF^{HIGH}=1$;

If $(E2<x<E3)$ then $NF^{HIGH}=(x-E2)/(E3-E2)$;

The BL value is the behavioral level which can be represented by a low number of discrete values (e.g., 16 discrete values).

In an embodiment, the detection sensitivity can be adjusted by changing the edge values (e.g., E1, E2, and E3). As a non-limiting example, a low sensitivity for some input features which vary between 0-100 may be adjusted by choosing E1=30, E2=45 and E3=60; while high sensitivity for such features values E1=10, E2=30 and E3=50 can be utilized.

In an alternative embodiment, for some input features, a feature function (FF) can be applied on the input feature. This feature function allows maintenance of static normalization functions while changing the value of an input feature (x) according to one of the adaptive mechanisms used. That is, the values E1, E2, and E3, will be constant per a normalization function, and only the input feature's value will be adapted respective of the external parameters. It should be noted that the feature functions are not mandatory and the normalization functions can operate with or without the feature functions.

Following is a non-limiting example of feature function ($FF_1$) and associated static normalization function (NF) is illustrated below. $FF_1$ is a process input (x) and generates an output value (d), as an input to the NF. Assuming for the example, a Gaussian feature CPM (Connection per minute), the $FF_1$ defined as follow:

Given a current measured value, x=CPM, the mean, μ=CPM_mu and the standard division (std), σ=sqrt(CPM_var)=sqrt(v). The function $FF_1$ is defined then as: d=(x−μ)/σ; d (the $FF_1$ output) can be considered as a "distance" of the new measure (x=CPM) from the learned mean, in units of the std, σ.

Therefore, the parameter 'd' is an adaptive "distance", a function of the earned mean value and 'std' of CPM. Then, the parameter 'd' is being translated to an input index of the normalization function (NF). In this example, the translation produces an index that represents cumulative percentage of CPM up to current CPM value (x). The NF is defined accordingly to produce behavior levels according to the degree of fulfillment in of each range (low, med, high). An example of NF is provided in FIG. 6, where this case the edges E1, E2, and E3 are set as static ones with the values of the accumulative percentage: E1=50% (Normal gauss range), E2=70% and E3=95%.

Referring back to FIG. 5, where in S530, a user of the system (e.g., a system administrator) is prompted to program at least one engine rule to describe an anomaly that the SDE should monitor, evaluate, and detect. In a preferred embodiment, the set of rules are programmed by selecting a logical operator (e.g., AND, OR, NOT etc.) and a value operator (Low, Med, High). The logical and value operators are applied to the input features selected in S510 (through the associated normalization function).

It should be noted that the programmed engine rules are checked by the system for correct syntax, semantics, and/or contradictions. Specifically, it is checked whether the selected value operators comply with the normalization functions determined in S520. For example, if a normalization function cannot compute a "high" behavioral level, then the rule cannot be programmed to include a "high" value operator. It should be further noted that the programming of engine rules is limited to selections of operators. As such, users are not required to code the rules with a programming language. In an embodiment, the programming is performed by means of a GUI where the user merely needs to drag-and-drop the selected features and operators. Some examples for engine rules are provided above.

In an alternative embodiment, S530 involves automatically populating a set of engine rules based on the selected input features and their respective normalization functions. In this embodiment, the user may be prompted to confirm and/or modify rules.

In S540, based on the engine rules defined in S530, an inference system is created. The inference system is configured to compute the score of anomaly (SoA) based on behavioral level (BL) indexes. In an embodiment, each rule is translated to an inference unit that implements a normalization function and a process in which the BL scores are projected into output functions. The output of an inference unit is a degree of fulfillment (DoF) index of each output function (e.g., High SOA, Med SOA, Low SOA output functions). As non-limiting example, if the engine rules are:

1. If $F_1$ is High OR $F_2$ is High then SOA is High
2. If $F_1$ is Med OR $F_2$ is Med then SOA is Med
3. If $F_1$ is Low OR $F_2$ is Low then SOA is Low Then the respective inference units will be realized using the following equations:

1. $Max(NF1(F_1)^{(High)}, NF2(F_2)^{(High)})$ then DoF is High
2. $Max(NF1(F_1)^{(Med)}, NF2(F_2)^{(Med)})$ then DoF is Med
3. $Max(NF1(F_1)^{(Low)}, NF2(F_2)^{(Low)})$ then DoF is Low where, $F_1$ and $F_2$ are the input features and NF1 and NF2 are the respective normalization functions determined for these features. Each inference unit outputs a degree of fulfilment index with respect to the operator values and the output function. Following the above example, the degree of fulfilment output indexes are:

$I_{high}$=Total (max) level of fulfilment for High DoF
$I_{med}$=Total (max) level of fulfilment for Med DoF; and
$I_{low}$=Total (max) level of fulfilment for Low DoF.

Finally, the SoA output by the SDE is computed based on the fulfilment indexes. In a non-limiting embodiment, the computation of the SoA may be performed by aggregating the indexes' value, selecting a maximum index's value, using a centroid method, and so on.

At the completion of S540, the SDE is ready for operation. As such, respective of any data collected or received respective of the input feature or features, the SDE computes the SoA for this feature or for the combination of all features. For example, if the feature is bytes per minute (BPM), any time that a new BPM is updated in a profile data structure (e.g., the profile data structure 410), the SoA for the BPM is output in the SDE.

In an embodiment, the engine rules of the SDE are analyzed to determine if and when the respective features' values can be sampled, and whether some or all of the input features can be aggregated or otherwise synchronized. This is particularly important when a few input features update at different time intervals. For example, in an embodiment where an input feature f1 is updated every 10 seconds, a feature f2 is updated every 1 minute, and feature f3 is updated every 5 minutes.

In an embodiment, features that should be fed to the SDE are synchronized. The synchronization operation includes saving values regarding the history of the highest frequency features during the time periods relevant to slower features. Following the above example, maximal values of the highest frequency feature (f1) over the last 1 minute (f1max1) and over the last 5 minutes (f1max5) are saved; additionally, maximal values of the feature f2 over the last 5 minutes (f2max5) are saved.

Then, the synchronization function feeds the values of each feature to the normalization function (or first to the feature function and then to the normalization) based on the saved maximal values and the currently received feature. As a non-limiting example, for the feature f1, the synchronization function may be as follows:

every time interval t1:
send f1curr (to the FF)
if f1curr>f1max1 ⇒ f1max1=f1curr
if f1curr>f1max5 ⇒ f1max5=f1curr
(if f1max1 or f1max5 has a "N/A" value, replace it with f1curr value)
every time interval t2:
if f1curr>f1max1 ⇒ f1max1=f1curr
send f1max1 (to the FF) and update its value to "N/A"
if f1curr>f1max5 ⇒ f1max5=f1curr
every time interval t3:
if f1curr>f1max5 ⇒ f1max5=f1curr
send f1max5 (to the FF) and update f1max5 and f1max1 values to "N/A".

"f1current" is the received current measurement.

Figure 7:
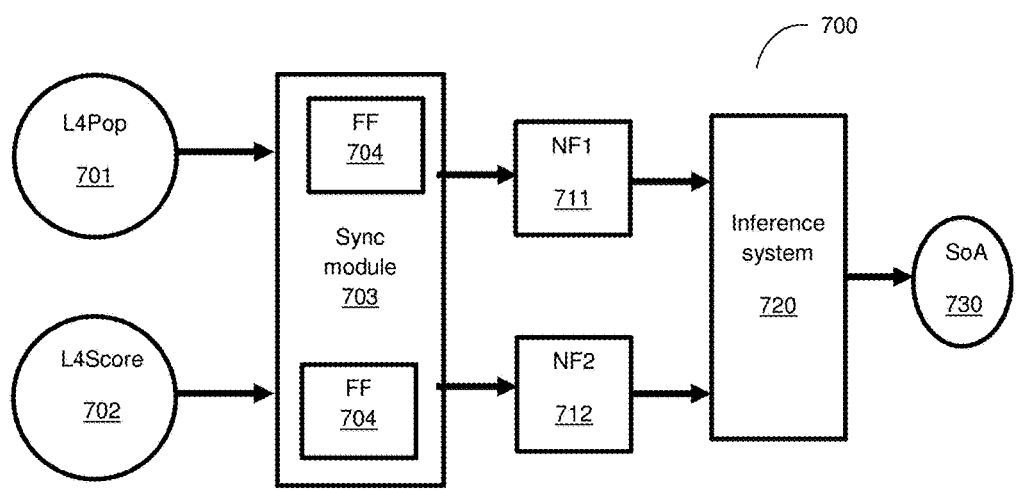
FIG. 7 is a schematic diagram illustrating the creation and operation of an anti-scan SDE according to an embodiment.

FIG. 7 is a schematic illustration of a non-limiting example for the programming of an anti-scan SDE 700 according to an embodiment. The SDE 700 can evaluate user-based network scanning activities, such as "pre-attack probe" activities. Typically, scanning activities are typified by a client side connection with relatively wide address distribution (destination IP addresses and/or destination L4 ports) and short size connections. Thus, two input features are selected to be evaluated by the anti-scan SDE "DestL4 Population" (or L4Pop 701) and "L4 connection score" (or L4Score 702).

The L4Pop 701 feature is the number of different flows in ΔT, where a flow is defined as a L4 connection with different destination IP addresses, port numbers, or combination thereof. The L4 score feature 702 is ratio of "real" flows in ΔT out of the total flows. A "real" flow is a flow that includes a full establishment of a TCP connection and data exchange, while non real flows are those connections that haven't completed the connection establishment process (i.e., the TCP three way handshake) or any connection which is very short (e.g., include only 1-2 packets).

In an embodiment, the L4Pop 701 feature and the L4 score feature 702 are analyzed by a synchronization module 703 via the respective feature functions 704 and 705 to feed the normalization functions 711 and 712, respectively, with synchronized and scaled feature values. As noted above, a feature function (FF) transforms the feature (x) into a new value that "integrates" the ability to adapt into the feature, thereby allowing the normalization functions 711 and 712 to be static.

The synchronization module 703 synchronizes between different features that are evaluated in different time frames (inside the data profile) and determines the feature value that will be fed into the normalization functions 711 and 712 as well as when that feature value will be fed.

Then, the normalization functions 711 and 712 are determined for the features 701 and 702 respectively. In this example, the normalization functions are as follows:

If $(x<=E1)$ then $NF^{(low)}=1$;

If $(x>=E2)$ then $NF^{(low)}=0$;

If $(E1<x<E2)$ then $NF^{(low)}=(E2-x)/(E2-E1)$;

If $(x<=E1)$ then $NF^{(med)}=0$;

If $(E1<x<E2)$ then $NF^{(med)}=(x-E1)/(E2-E1)$;

If $(E2<x<E3)$ then $NF^{(med)}=(E3-x)/(E3-E2)$;

If $(x>=E3)$ then $NF^{(med)}=0$;

If $(x<=E2)$ then $NF^{(high)}=0$;

If $(x>=E3)$ then $NF^{(high)}=1$;

If $(E2<x<E3)$ then $NF^{(high)}=(x-E2)/(E3-E2)$;

In this example, the value 'x' is replaced by values of the input features 701 and 702. The values E1, E2, and E3 are set in a static manner (non-adaptive), respective of the input features. In this example, for L4Pop 701, E1=5, E2=10, and E=15; and for L4Score 702, E1=10%, E2=30%, and E3=50%.

Computing the normalization function 711 on a value of the L4Pop between 1 and 15 (e.g., x=1, . . . , 15) would result in Low, Med, and High behavioral level (BL) values that are integer numbers between 1 and 10. Similarly, computing the normalization function 712 on a value of the L4 score between 1 and 25 (e.g., x=1, . . . , 25) would result in Low, Med, and High behavioral levels values that are integer numbers between 0 and 1.

Then, a set of engine rules are defined. In this example, the engines rules apply on the input features are:

If L4Pop is High OR L4Score is High then SOA is High
If L4Pop is Med OR L4Score is Med then SOA is Med
If L4Pop is Low OR L4Score is Low then SOA is Low Then, the inference system 720 is generated for the above-mentioned rules. The system will implement the following rules. The inference system 720 is a set of respective inference units that are realized based on the following equations:

Max($NF1(L4Pop)^{(High)}$, $NF2(L4Score)^{(High)}$) then DoF is High

Max($NF1(L4Pop)^{(Med)}$, $NF2(L4Score)^{(Med)}$) then DoF is Med

Max($NF1(L4Pop)^{(Low)}$, $NF2(L4Score)^{(Low)}$) then DoF is Low

For example, if L4Pop>15, then $NF_1(L4Pop)^{(High)}=1$ and L4Score=1, then $NF2(L4Score)^{(High)}=0.5$, then the SOA is high. As noted above, a DoF index ($I_{high}$, $I_{med}$, and $I_{low}$) is computed for the fulfillment of each of high SoA, Med SoA, and Low SoA output functions (all that is done in the inference process).

The inference system 720 also includes an output function that computes the SoA 730 output by the engine. In this example, the output function is computed the centroid method which is given by:

$$A_{(low)} = 4I_{(low)} - 2I^2_{(low)};\ A_{(med)} = 4I_{(med)} - 2I^2_{(med)};\ A_{(high)} = 4I_{(high)} - 2I^2_{(high)}$$

$$SoA^{(final)} = \frac{2A_{(low)} + 6A_{(med)} + 10A_{(high)}}{A_{(low)} + A_{(med)} + A_{(high)}}$$

The $SOA^{(final)}$ is the SoA 730 output of SDE 700.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a security decision engine (SDE) operable in a cyber-security system comprising one or more computing devices coupled to a memory device to receive information about data flows in a network, comprising:

selecting, based on at least one input feature indicating an attribute of a behavior to be evaluated, at least one normalization function from an available plurality of normalization functions, wherein the at least one input feature defines an attribute of a data flow to be evaluated by the SDE, wherein the normalization function is a function applied to the input feature data to yield behavioral levels and generate respective degrees of membership;

in response to the selection of the input feature, prompting a user of the cyber-security system to program at least one engine rule to describe an anomaly that the SDE should monitor, evaluate, and detect anomalies, wherein the set of rules are programmed by selecting a logical operator and a value operator;

receiving at least one engine rule describing an anomaly to be evaluated, wherein each engine rule defines the at least one input feature and a set of logical conditions to be applied to behavioral levels of the at least one input feature;

in response to programming the at least one engine rule, creating an inference system including at least one inference unit that implements the normalization function and a process in which the behavioral level scores are projected into output functions, wherein each inference unit is determined based on one of the received at least one engine rule and to compute, a score of anomaly (SoA) based on the at least one input feature; and executing the SDE after the inference system is created to compute (SoA) based on at least one input feature, wherein input features fed into the SDE are synchronized to detect and mitigate on-going attack campaign.

2. The method of claim 1, further comprising:
determining at least one of: a synchronization function to synchronize between values of the at least one input feature, and a feature function to be applied on the values of the at least one input feature.

3. The method of claim 2, further comprising:
applying the at least one normalization function to one of the at least one input feature to yield behavioral levels, wherein the score of anomaly is further computed based on the behavioral levels.

4. The method of claim 3, wherein each of the at least one normalization function is defined using at least a plurality of edge values and at least one normalization function parameter, wherein the plurality of edge values determine a degree of membership of the received input feature's value to a certain behavioral level, wherein further the normalization function parameter sets the characteristics of the selected normalization function.

5. The method of claim 1, wherein each of the received at least one engine rule includes at least a logical operator and a value operator applied on the input feature.

6. The method of claim 5, wherein receiving the at least one engine rule further comprises:
determining the at least one engine rule based on the received input feature and the at least one normalization function.

7. The method of claim 1, wherein each inference unit outputs a degree of fulfillment index based on the at least one input feature.

8. The method of claim 1, wherein the score of anomaly is computed by any one of: aggregating the degree of fulfillment indexes, selecting a maximum or minimum degree of fulfillment based on logical operators of the at least one engine rule, and using a centroid method.

9. The method of claim 1, wherein the at least one normalization function is determined based on at least one normalization parameter instruction.

10. The method of claim 9, wherein each of the at least one input feature is associated with a finite set of normalization functions.

11. The method of claim 10, wherein each determined normalization function is a default normalization function for one of the at least one input feature.

12. The system of claim 11, wherein the system is further configured to:
determine the at least one engine rule based on the at least one input feature and the at least one normalization function.

13. A non-transitory computer readable medium having stored thereon instructions for causing one or more processing units to execute the method according to claim 1.

14. A system for generating a security decision engine (SDE) operable in a cyber-security system to receive information about data flows in a network, comprising:
a processing device; and a memory device, the memory device containing instructions that, when executed by the processing device, cause the system to:

select, based on at least one input feature indicating an attribute of a behavior to be evaluated, at least one normalization function from an available plurality of normalization functions, wherein the at least one input feature defines an attribute of a data flow to be evaluated by the SDE, wherein the normalization function is a function applied to the input feature data to yield behavioral levels and generate respective degrees of membership;

in response to the selection of the input feature, prompting a user of the cyber-security system to program at least one engine rule to describe an anomaly that the SDE should monitor, evaluate, and detect anomalies, wherein the set of rules are programmed by selecting a logical operator and a value operator;

receive at least one engine rule describing an anomaly to be evaluated, wherein each engine rule defines the at least one input feature and a set of logical conditions to be applied to behavioral levels of the at least one input feature;

in response to programming the at least one engine rule, create an inference system including at least one inference unit that implements the normalization function and a process in which the behavioral level scores are projected into output functions, wherein each inference unit is determined based on one of the received at least one engine rule and to compute, a score of anomaly (SoA) based on the at least one input feature; and executing the SDE after the inference system is created to compute (SoA) based on at least one input feature, wherein input features fed into the SDE are synchronized to detect and mitigate on-going attack campaign.

15. The system of claim 14, wherein the memory is further configured to contain a plurality of normalization functions.

16. The system of claim 14, wherein the system is further configured to:
determine at least one of: a synchronization function to synchronized between values of the least one at least one input feature, and a feature function to be applied on the values of the at least one input feature.

17. The system of claim 14, wherein the system is further configured to:
apply the at least one normalization function to one of the at least one input feature to yield behavioral levels, wherein the score of anomaly is further computed based on the behavioral levels.

18. The system of claim 17, wherein each of the at least one normalization function is defined using at least a plurality of edge values and at least one normalization function parameter, wherein the plurality of edge values determine a degree of membership of the received input feature's value to a certain behavioral level, wherein further the normalization function parameter sets the characteristics of the selected normalization function.

19. The system of claim 14, wherein each of the received at least one engine rule includes at least a logical operator and a value operator applied on the input feature.

20. The system of claim 14, wherein each inference unit outputs a degree of fulfillment index based on the at least one input feature.

21. The system of claim 14, wherein the score of anomaly is computed by any one of: aggregating the degree of fulfillment indexes, selecting a maximum degree of fulfillment, and using a centroid method.

22. The system of claim 14, wherein each of the at least one input feature is associated with a finite set of normalization, wherein each determined normalization function is a default normalization function for one of the at least one input feature.

* * * * *